United States Patent [19]

Johnson et al.

[11] 4,078,245

[45] * Mar. 7, 1978

[54] SYSTEM FOR MULTIPLEXING INFORMATION CHANNELS ADJACENT TO A VIDEO SPECTRUM

[75] Inventors: J. Walter Johnson, Walnut Creek; Herbert H. Borchers, Pleasant Hill, both of Calif.

[73] Assignee: Coastcom, Inc., Concord, Calif.

[*] Notice: The portion of the term of this patent subsequent to Nov. 4, 1992, has been disclaimed.

[21] Appl. No.: 628,235

[22] Filed: Nov. 3, 1975

Related U.S. Application Data

[62] Division of Ser. No. 369,481, Jun. 13, 1973, Pat. No. 3,917,906.

[51] Int. Cl.² .................. H04N 7/10; H04N 7/08; H04B 1/06
[52] U.S. Cl. ........................... 358/86; 358/142; 325/346
[58] Field of Search .............. 178/5.6 R, 5.6 A; 325/308, 346; 358/142, 143, 86, 198

[56] References Cited

U.S. PATENT DOCUMENTS

| | | | |
|---|---|---|---|
| 2,708,716 | 5/1955 | Boothroyd | 358/143 |
| 3,195,059 | 7/1965 | Adams | 325/346 |
| 3,371,281 | 2/1968 | Powell | 325/346 |
| 3,530,383 | 9/1970 | Sassler | 325/346 |
| 3,684,823 | 8/1972 | McVoy | 325/392 |
| 3,889,051 | 6/1975 | Legler | 178/5.6 |
| 3,917,906 | 11/1975 | Johnson et al. | 325/346 |

*Primary Examiner*—John C. Martin

[57] ABSTRACT

A system for multiplexing either a single or multiple information channels adjacent to the video spectrum on a TV microwave or cable by frequency modulating a high frequency subcarrier at wide deviation with one or composite information signals, translating the modulated subcarrier to a frequency adjacent to and above the video spectrum, and then bridging it into the video circuit at a level 20 dB or more below the peak video signal of the video spectrum. The system recovers the transmitted subcarrier from the video spectrum, synthesizes the subcarrier frequencies exclusive of most of the video interference in a limited bandwidth, and then detects the modulation of the synthesized subcarrier frequency.

3 Claims, 4 Drawing Figures

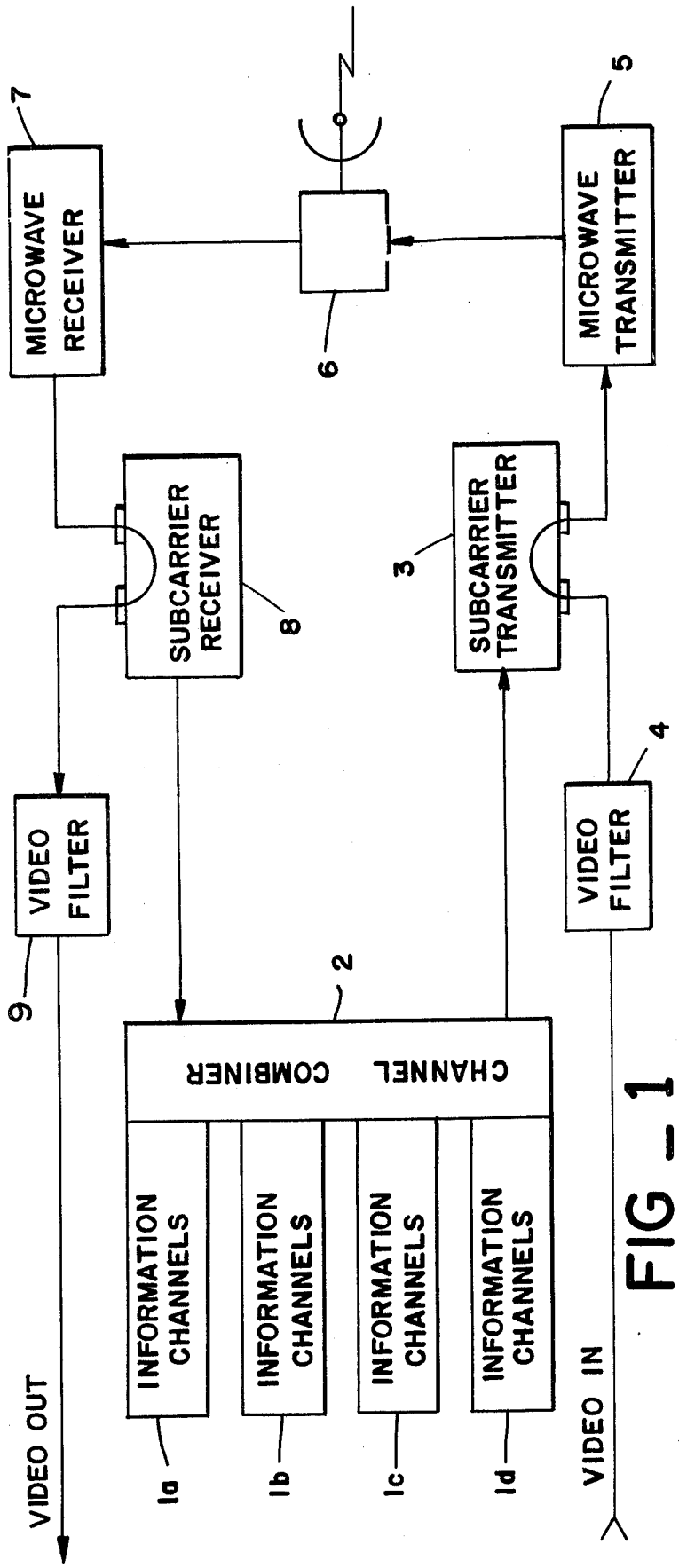
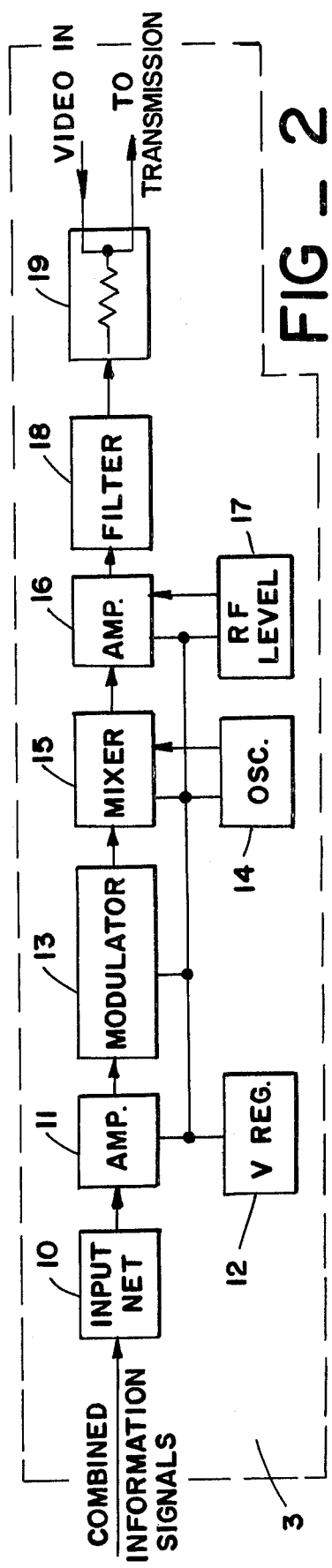

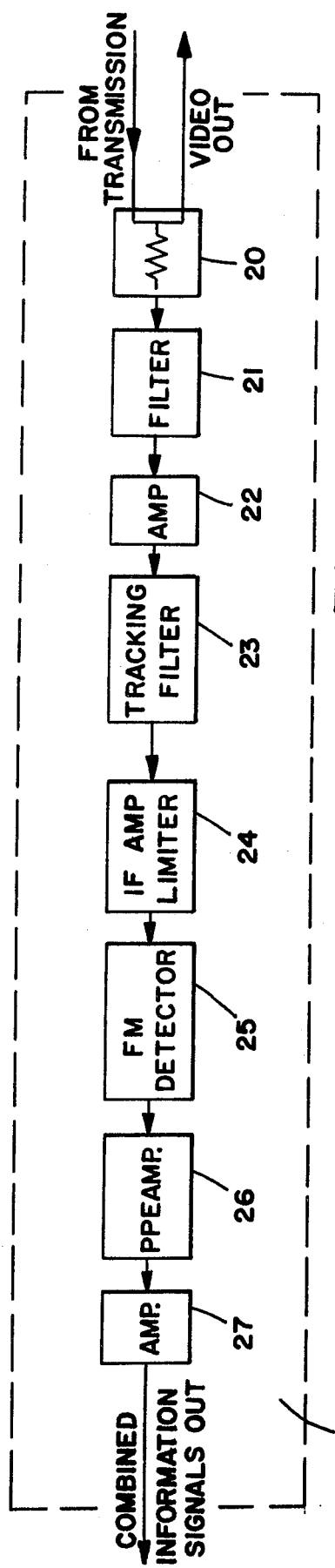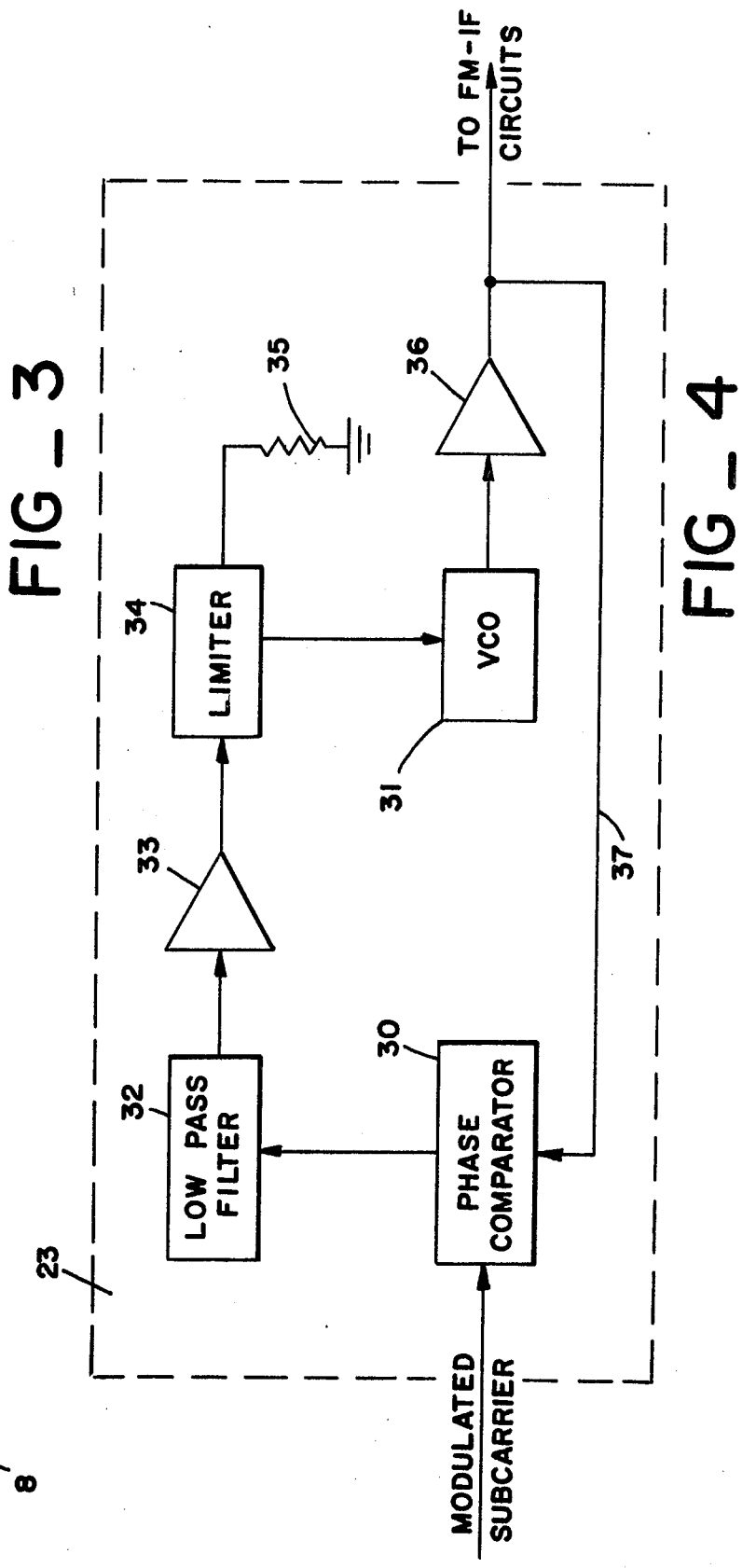

SYSTEM FOR MULTIPLEXING INFORMATION CHANNELS ADJACENT TO A VIDEO SPECTRUM

BACKGROUND OF THE INVENTION

This application is a division of copending application Ser. No. 369,481 filed June 13, 1976 entitled SYSTEM FOR MULTIPLEXING INFORMATION CHANNELS ADJACENT TO A VIDEO SPECTRUM now U.S. Pat. No. 3,917,906 issued Nov. 4, 1976.

This invention relates generally to information transmission and distribution and, more particularly, relates to the multiplexing of single or multiple information channels adjacent to the video spectrum on a video circuit such as a TV microwave or cable system.

Ever since commercial network television began, long distance program distribution has faced video and audio transmission interference problems. Initially, the then-available microwave equipment posed difficulties for video transmission alone and it was necessary to handle the accompanying audio separately over a parallel telephone microwave circuit. Several multiplexing techniques later were developed to reduce video-audio transmission costs. Eventually, the industry employed as FM subcarrier for the audio positioned 2-3 MHz above the video portion of the program. But even then video intermodulation has limited the signal-to-noise performance and long haul applications.

As microwave transmission increased, the need also arose for multiple audio and other information channels above the video. This poses other microwave transmission interference problems. The spectrum above the video portion of a typical microwave channel generally is found to be unuseable because of the intermodulation products with the video when multiple audio and other information channels are inserted. The problem is further compounded by the intermodulation interference between the additional channels themselves which intrudes into the video spectrum. As a consequence, multiple program audio and information channels on video circuits heretofore have been technically and economically unsatisfactory.

The system of the present invention makes it practical to add either a single or multiple, high quality voice and data channels directly above the video spectrum on an existing TV microwave or cable system at a nominal investment in terminal equipment.

The system design is based in part upon the discovery that TV microwave and cable systems typically exhibit multiple harmonics of the 15,750 Hz horizontal video sync pulse and intermodulation products of the sync pulse and inserted subcarriers at 45-55 dB below the video signal. This interference is typically a fixed amount below the subcarrier injection level regardless of the subcarrier amplitude. The intermodulation products are generated throughout the microwave system particularly in multiple hop systems. If a single sideband multiplex is applied directly above the video spectrum, the full amplitude of the harmonics and interference is heard in that or adjacent multiplex channels. The system design also is based upon the discovery that multiplex signals modulated into the circuitry at not more than 20 dB down below the video level cause interference with the video. If the multiplex is modulated into the circuitry 20 dB or more below the video information, interference with the video information no longer is objectionable, but with the overall sync interference at 45-55 dB below the peak picture, intelligible interference appears in the information channels only 25-40 dB below the multiplexed information. Moreover, an accumulative end-to-end frequency drift relative to the harmonics of the 15,750 Hz sync is usually apparent and makes the sync pulse inteference appear to move within the channel.

The present invention solves the video sync interference difficulty by first fixing that interference relative to one or more stable FM subcarrier frequencies and then by filtering or avoiding the interference to produce interference-free channels for high quality voice and data transmission. The sync interference is avoided by tracking a narrow noise bandwidth and by synthesis of the recovered subcarrier frequencies isolating the later detected modulation signals from the rejected interference.

Therefore, a principal object of the invention is to fix in frequency the interference produced by an adjacent video sync signal relative to one or more stable FM subcarriers inserted above a video spectrum so that this interference either can be filtered out or avoided by subsequent processing.

A further object of the invention is to provide information channels which, by improved recovery of an FM subcarrier, are insensitive to the amplitude modulated intermodulation products of the horizontal sync pulses.

One other object of the invention is to provide a system in which picture interference is eliminated by bridging FM subcarrier multiplex onto the TV microwave or cable system at a level 20 dB or more below the peak video information.

Another object of the invention is to eliminate picture fluctuation due to loading changes by use of FM subcarriers adjacent to the video spectrum for the information channels which do not vary in amplitude with modulation and thus present a constant load to the microwave or cable amplifier.

Other objects and advantages of the present invention will become apparent upon consideration of the specific embodiment described in connection with the accompanying drawings wherein FIG. 1 is a functional block diagram of a typical multiplex system utilizing this invention;

FIG. 2 is a block diagram for an FM subcarrier transmitter useful in the system;

FIG. 3 is a block diagram for an FM subcarrier receiver useful in the described system; and FIG. 4 is a schematic block diagram of the tracking filter of FIG. 3.

The generalized system of this invention shown in FIG. 1 typically includes one or more information channels or groups of information channels 1a - 1d which supply audio, data, orderwire or other information signals directly or in the form of multiplexed single sideband suppressed carrier signals to a channel combiner 2. There the several information signals are combined into one composite information signal and then supplied to the FM subcarrier transmitter 3. In the FM subcarrier transmitter the composite information signal frequency modulates a high frequency subcarrier with a wide deviation ratio, the subcarrier is translated to a lower predetermined frequency, and then bridged directly onto the TV microwave or cable adjacent to and above the video spectrum. The video input passes through video filter 4 which may be a notch filter when a single FM subcarrier is used or a video lowpass filter when two or more subcarrier frequencies are employed to carry the information signal modulation. The composite modulated subcarrier frequency and video spectrum, for example at 0 to 10 MHz with the video at 0 to 4.5 MHz, are applied to microwave transmitter 5 for transmission as at 6. The system is equally useful for transmitting the composite video-FM subcarrier modulated signals over a cable TV or sattelite link.

The transmitted composite baseband received by a microwave receiver 7 from an antenna 6 supplies FM subcarrier receiver 8 where the modulated subcarrier frequencies are filtered and demodulated. The demodulated composite information signal returns through channel combiner 2 to the receiver side of information channels 1a – 1d where the signals are processed for use. The video portion passes through video filter 9 to remove the modulated subcarrier. Video filter 9 also is a notch filter for single subcarrier operation and for multiple subcarrier applications is a delay-equalized video lowpass filter.

The constant load characteristics of the FM subcarrier eliminate picture fluctuation which otherwise may be caused by loading changes in the adjacent information channels. The FM subcarrier does not vary in amplitude with changes in modulation and thus presents a constant load to the microwave or cable amplifier.

The FM subcarrier transmitter 3 of FIG. 1 is shown schematically in FIG. 2. It includes an input network 10 for a balanced or unbalanced input information signal from channel combiner 2 and includes preemphasis of the higher frequencies. Input signal amplifier 11 amplifies the information signal and supplies it to a wideband, very low distortion modulator 13 which is, for example, a voltage controlled oscillator operating at approximately 15 MHz to permit wide deviation adjustable ± 150 KHz or more for maximum FM signal-to-noise for recovery of quality signals. The supply voltage to the amplifier and other circuits of the FM subcarrier transmitter 3 are regulated by voltage regulator 12. A variable trimming capacitor in the oscillator resonant circuit adjusts the subcarrier frequency to that desired at the output of the FM subcarrier transmitter 3.

Mixer 15 supplied by crystal controlled oscillator 14 operating at a fixed frequency in the order of 25 MHz translates the modulated FM subcarrier from modulator 13 to a lower frequency suitable for direct insertion upon the system adjacent to and above the video spectrum. The mixer 15 may be a balanced modulator with the frequency of crystal controlled oscillator 14 selected so that the difference frequency is within the system band pass and the additive frequencies are outside the band pass of the FM subcarrier transmitter 3. For example, with the frequency of oscillator 14 at 25 MHz and the modulator operating at 15 MHz the additive sideband is at 40 MHz and outside of the system band pass.

The translated frequency modulator subcarrier is amplified in output amplifier 16 which in a preferred embodiment has a tuned output filter circuit 18 to filter out the additive 40 MHz frequency of the mixer 15 and an RF level adjustment means 17 to adjust the output signal level so that all noise and spurious signals are at least 50 dB below modulated subcarrier. The FM subcarrier output is bridged directly onto the 75 ohm video circuit by high impedance combiner 19. It can be a simple hairpin loop connected to closely spaced BNC fittings. This diplexing is passive so the video and message integrity and reliability are maintained. The subcarrier insertion is at least 20 dB down below the peak video signal received from video filter 4.

Modulation of a relatively high frequency subcarrier at wide deviation ratios and then translation of that modulated frequency to a subcarrier frequency appropriate for insertion upon the baseband at 4–10 MHz produces a very linearly frequency modulated subcarrier and eliminates the historic problems of high distortion and the more narrow deviation ratios practical with direct FM modulation at the appropriate lower subcarrier frequency. The FM subcarrier fixes in frequency its intermodulation products with the video sync pulses when the FM subcarrier is applied adjacent to the video spectrum so that those products can be more easily rejected at the FM subcarrier receiver.

The FM subcarrier receiver 8 is designed to ignore the intermodulation products in the incoming TV microwave or cable baseband which typically are 25-35 dB or more below the received subcarrier level by setting the tracking threshold at a level slightly above the video interference. This eliminates substantially all of the video sync interference in all but the poorest operating conditions. The FM subcarrier receiver 8 accepts the transmitted signal from the microwave receiver 7 at combiner 20. The modulated subcarrier frequencies are filtered from the signal by filter 21 tuned to the subcarrier center frequency and then amplified in amplifier 22 which, for example, may be a field effect transistor amplifier.

A phase locked loop threshold extender which operates as a tracking filter 23 follows the subcarrier frequency and reduces the incoming noise band to a small segment centered about the subcarrier frequency. For example, the noise bandwidth may be set in the order of 30 KHz for a subcarrier deviation of 150 KHz. The phase locked loop further isolates the subsequently detected subcarrier from unwanted noise and sync interference by synthesizing the tracked subcarrier frequencies and then supplying them to an IF amplifier/limiter 24, followed by FM detector 25 and preamplifier 26. The latter three components may be an integrated circuit commercially available for high fidelity FM intermediate frequency systems including, for example, a three-stage FM-IF amplifier/limiter configuration with level detectors for each stage, a doubly balanced quadrature FM detector and external linear detector coil and an audio frequency preamplifier. The preamplified and demodulated information signals then are amplified in amplifier 27 with deemphasis of the higher frequencies and supplied to channel combiner 2 and subsequent output processing as described in connection with FIG. 1.

The phase locked loop or tracking filter 23 may be a commercially available integrated circuit shown schematically in the block diagram of FIG. 4. The loop includes phase comparator 30 to compare the phase of the preamplified modulated subcarrier with that of a local subcarrier frequency generated by voltage controlled oscillator 31 with its free running oscillation at the subcarrier center frequency. The phase comparator 30 generates an error voltage proportional to the difference in phase of the local and incoming subcarrier frequencies. This error voltage passes through low pass filer 32 to d-c voltage amplifier 33 and limiter 34 to set a tracking range fixed by resister 35 within which the amplified voltage controls the frequency of VCO 31 to track the incoming subcarrier frequency. The output of VCO 31 is amplified in amplifier 36 and closes the loop to phase comparator 30 at 37.

The noiseband tracked by the phase locked loop is a narrow segment around the subcarrier frequency. Most of the sync intermodulation interference has been fixed at frequencies outside of the tracked noise bandwidth by the single wideband subcarrier frequency rather than multiple frequencies for the individual information channels. The phase locked loop thus locks onto the higher level subcarrier frequencies, which typically are 25–35 dB above the video sync interference, and ignores the lower amplitude modulated sync intermodulation products of the subcarrier frequency. The output of voltage controlled oscillator 31 synthesizes the incoming subcarrier deviations and supplies the very linear intermediate frequency and detection stages of the FM subcarrier receiver to further isolate the subsequently demodulated subcarrier frequencies from unwanted noise. The interference sensitive detection stages are therefore completely isolated from the video signal.

The described functional circuits are well-known and can readily be assembled from standard components. Various modifications to the specific circuitry that is described will be apparent to those skilled in this art. The invention is defined in the following claims.

We claim:

1. A method for recovering an information signal multiplexed with a video spectrum that includes sync pulses with the information signal being frequency modulated on a subcarrier having a center frequency and multiplexed with said video spectrum at a level at least 20 db below the peak level of said video spectrum so that the intermodulation products of the information signal and multiple harmonics of said sync pulses are at a level at least 45 db below said video spectrum, said method comprising the steps of:
   filtering the frequency modulated subcarrier and video spectrum to separate one from the other;
   synthesizing substantially only the frequency modulated subcarrier by tracking a portion of said modulated subcarrier adjacent to and including said center frequency of said subcarrier, said portion tracked including less than the full deviation of said modulated subcarrier to exclude said intermodulation products; and
   demodulating the synthesized modulated subcarrier.

2. An apparatus for recovering an information signal multiplexed with a video spectrum that includes sync pulses with the information signal being frequency modulated on a subcarrier with a center frequency and multiplexed with said video spectrum at a level at least 20 db below the peak level of said video spectrum so that the intermodulation products of the information signal and multiple harmonics of said video sync pulses are at a level at least 45 db below said video spectrum, said apparatus comprising:
   filter means to receive and separate said frequency modulated subcarrier and said video spectrum;
   a tracking filter for receiving the separated frequency modulated subcarrier and synthesizing substantially only the modulated subcarrier by tracking a portion of said modulated subcarrier adjacent to and including said center frequency of said subcarrier, said portion tracked including less than the full deviation of said modulated subcarrier to exclude said intermodulation products; and
   demodulator means for demodulating the synthesized modulated subcarrier.

3. The apparatus of claim 2 wherein the tracking filter is a phase locked loop having a local oscillator, the frequency of which is responsive to an applied error voltage and normally at the subcarrier center frequency; comparator means developing an error voltage proportional to the difference in phase between the instantaneous tracked subcarrier frequency and the frequency of the local oscillator, the tracking threshold of said phase locked loop being set to exclude interference due to said video sync pulses which is below the subcarrier signal; means applying the error volage within predetermined tracking limits to said local oscillator; and means applying the local oscillator frequency to the demodulator means.

* * * * *